FIG. 1

INVENTOR
JOHN W. MACOMBER
BY
ATTORNEYS

FIG. 2

Aug. 3, 1965  J. W. MACOMBER  3,198,709
NUCLEAR REACTOR CONTROL ROD ASSEMBLY
WITH IMPROVED DRIVING MECHANISM
Filed May 1, 1963  7 Sheets-Sheet 7

INVENTOR
JOHN W. MACOMBER

BY *G. D. O'Brien*
*Gene E. Shook* ATTORNEY 3,198,709
Patented Aug. 3, 1965

3,198,709
NUCLEAR REACTOR CONTROL ROD ASSEMBLY WITH IMPROVED DRIVING MECHANISM
John W. Macomber, Bay Village, Ohio, assignor to the United States of America as represented by the Administrator of the National Aeronautics and Space Administration
Filed May 1, 1963, Ser. No. 277,402
11 Claims. (Cl. 176—35)
(Granted under Title 35, U.S. Code (1952), sec. 266)

The invention described herein may be manufactured and used by or for the Government of the United States of America for governmental purposes without the payment of any royalties thereon or therefor.

The present invention is concerned with apparatus for regulating the power level in a nuclear reactor, and more particluarly with a novel control rod having an improved driving mechanism.

The power level of a nuclear reactor is customarily regulated with control rods mounted in spaced parallel relationship for reciprocating movement along their longitudinal axes into and out of the reactor core, and the temperature of the rods is controlled by circulated cooling water. Each rod has a poison section which customarily contains cadmium, either a reflector section containing beryllium metal or a fuel section containing uranium, and a guide section for preventing sideways movement of the rod normal to its longitudinal axes. When a fuel section in a conventional control rod burns out, the entire rod unit must be replaced.

A driving mechanism is provided to move each control rod along its longitudinal axis, and the power level of the reactor is increased by moving the fuel sections of the rods toward the center of the core while the power level is lowered by the movement of the rods in the opposite direction. In the event of a dangerous power excursion, the rods must be withdrawn rapidly, either by a fast reverse of the driving mechanism, or, in an extreme case with vertically extending rods, by what is termed a "scram." To cause a scram, the control rods are disconected from the driving mechanism and permitted to drop, with provisions being made to limit the movement of the rods to properly position the poison sections relative to the reactor core. It has been found that for safe operation, each control rod should commence its drop within forty milliseconds from the start of the disconnect operation.

The mechanism for driving the rod into and out of the reactor is customarily located above the core and is provided with a magnetic device for initiating a scram release. This position of the drive mechanism limits the access to the reactor core for refueling, instrumentation and the installation of experiments. Another disadvantage inherent with this type of mechanism is that many times no provision is made for the positive withdrawal of a control rod that has become wedged in the core.

In an attempt to solve the problems arising from the use of the top drive for the control rods, a bottom drive has been proposed wherein the driving mechanism is mounted below the core. While this position of the control rod drive mechanism is highly desirable, the device requires closely fitted parts, and any slight corrosion or galling may prevent a rod from dropping during a scram. Another problem arising from certain bottom drives is that there is no provision made for the positive withdrawal of a stuck control rod.

Sectional control rods have been proposed which utilize removable fuel sections to eliminate the necessity of replacing the entire rod unit. However, such rods lack sufficient axial clamping force between the sections to eliminate flexing at the joints.

According to the present invention, there is provided a plurality of elongated control rod assemblies forming both regulator rods and shim-rods which extend vertically through a reactor core and are arranged in substantial juxtaposition with the fuel elements of the core. Each of these control rod assemblies has either a reflector section or a fuel section interposed between a poison section and a guide section, and provision for easy assembly is made whereby these sections are selectively joined together. Driving apparatus is mounted below the reactor core to extend or retact the control rods into and out of the core to altar the reactor power level. Means are provided for operably connecting the driving apparatus to the control rods, and each shim-rod has a drive-release mechanism incorporating members that are movable into and out of engagement with the guide sections of the shim-rods. Provision is also made for disassembling the sections independently of the operation of the connecting devices so that sections of the control rods can be readily replaced.

It is, therefore, an object of the present invention to provide an improved reactor control rod assembly with replaceable sections and an improved rod driving mechanism located below the assembly.

Another object of the invention is to provide an improved control rod assembly for regulating the power level in a nuclear reactor having a control rod driving mechanism located below the reactor core, and including an improved device for scramming the control rod in case of a dengerous power excursion within forty miliseconds.

Still another object of the invention is to provide a reactor control rod assembly having a replaceable fuel section and a reusble poison section.

A still further object of the invention is to provide a rigid, sectionalized control rod for a nuclear reactor that when assembled is continuous with no flexing at the joints between the sections, and which provides for the locking of the sections in their proper positions.

Other objects and disadvantages of the invention will be apparent from the specification which follows and from the drawing in which like numerals are used to identify like parts.

Figure 1:
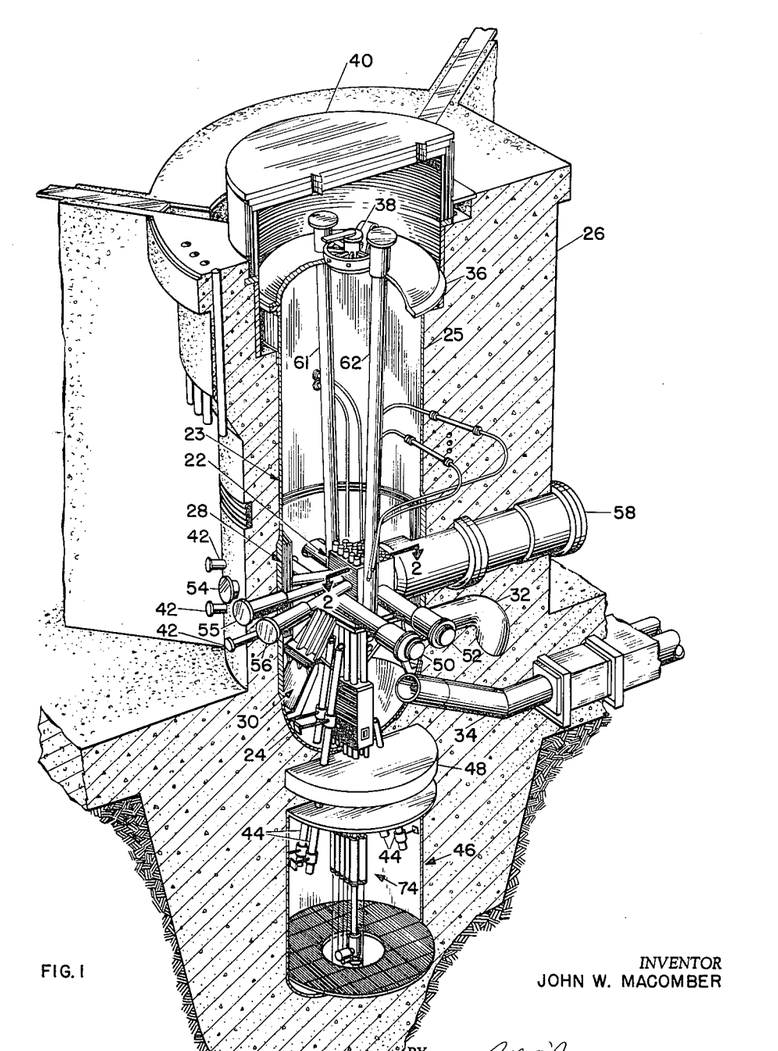
FIG. 1 is a cutaway perspective view of a containment tank that encloses a nuclear reactor utilizing the improved control rod and driving mechanism of the present invention.

Referring now to the drawings, there is shown in FIG. 1 a nuclear reactor assembly having a core 22 located within a vertically extending pressure tank 23 that has a generally hemispherical bottom 24 connected to a cylindrical wall 25. The pressure tank 23 is mounted in high density concrete 26 surrounded by water for biological shielding. Thermal shields 28 in the form of concentric annuli of curved metal plates encircle the reactor core 22 and the solid shielding is adequate during a shutdown period while the additional shielding provided by the water is sufficient for test periods.

A suitable supporting structure 30 in the lower portion of the pressure tank 23 mounts the core in the proper position relative to the tank and shields. The supporting structure 30 has a generally circular base adjacent the junction between the bottom 24 and the wall 25, and this structure extends upward and inward through a transition to a rectangular configuration adjacent the reactor core 22. The supporting structure 30 not only absorbs shock loads incident to the operation of the reactor, but also separates cooling water flowing upward from an inlet pipe 32 through a portion of the core 22 and between the thermal shields 28, then downward through the remainder of the reactor core 22 to an outlet pipe 34 near the bottom of the tank 23. The upper end of the cylindrical wall 24 has a cover 36, and a suitable hatch 38 in the center of the cover 36 provides access to the interior of the tank 23. A shrapnel shield 40 is positioned immediately above the hatch 38 to provide protection against both gamma rays and damage to the surrounding structure in the event of an explosion.

Figure 2:
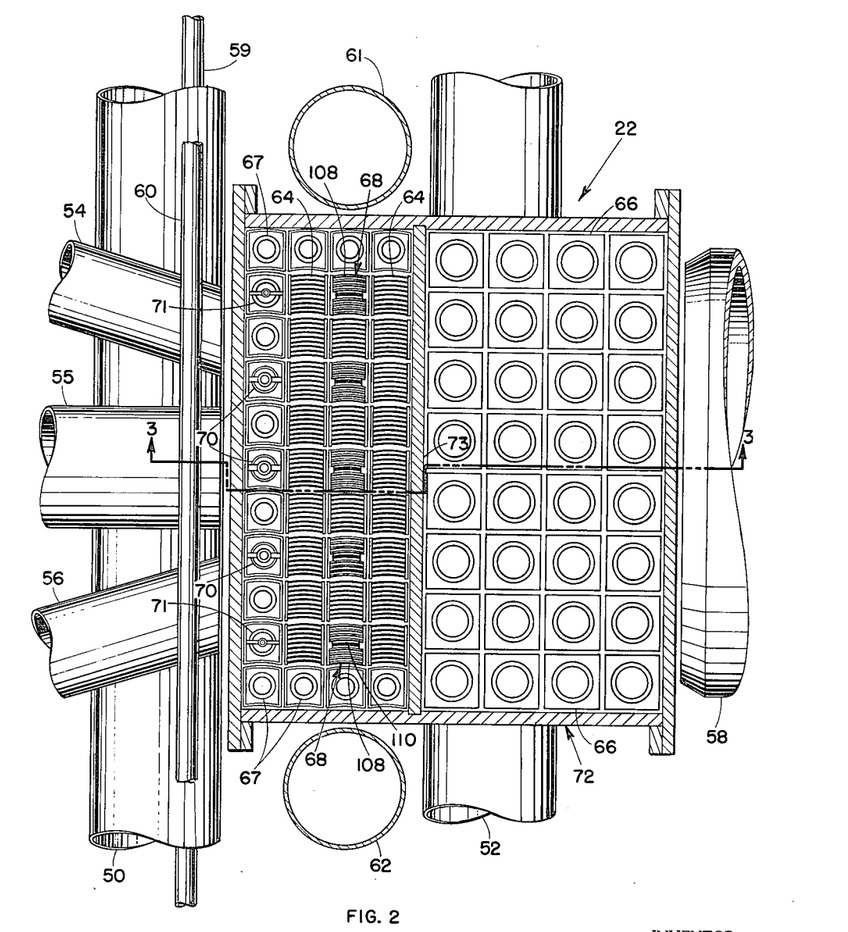
FIG. 2 is an enlarged horizontal sectional view of the reactor core taken along the line 2—2 in FIG. 1.

A plurality of horizontal instrumentation tubes 42 of various diameters are spaced around the periphery of the wall 25, and these tubes protrude inward toward the reactor core 22 while a plurality of inclined instrumentation tubes 44 project from a sub-pile room 46 through a lead shield 48 into the pressure tank 23. A pair of parallel tubes 50 and 52 extend horizontally through the pressure tank 23 to form horizontal through holes which are distinguishable from the instrumentation tubes 42 and 44 in that both ends of the tubes 50 and 52 penetrate the wall 25. Various experiments are enclosed in containers which are inserted into these horizontal test holes for exposure to the reactor core 22. As shown in FIGS. 1 and 2, three horizontally positioned pipes 54, 55, and 56 extend outward from the core 22 through the walls 25 to form horizontal beam holes to guide the emergence of neutron beams while a greatly enlarged tubular member 58 extends through the opposite side of the pressure tank 23 to form a thermal column for shielding experiments and irradiation studies of relatively large bodies. If desired, a pair of carrier tubes 59 and 60 shown in FIG. 2 which penetrates the pressure tank wall 25 at each end may be provided. A pair of substantially vertical tubes 61 and 62 having closed lower ends project downward from the cover 36 on opposite sides of the hatch 38. These tubes form vertical test holes along opposite sides of the reactor core 22 and are especially useful for conducting pumped loop experiments.

The reactor core 22 is a box-like assembly which houses an active lattice of stationary fuel elements 64 arranged in a grid array and a reflector grid of beryllium blocks 66. The reactor core 22 shown in FIG. 2 has twenty-two stationary fuel elements and thirty-two beryllium blocks. Each fuel element 64 has a brazed assembly of uranium bearing aluminum-clad curved plates; however, the detailed construction of the fuel elements forms no part of the present invention. Twelve beryllium reflector pieces 67 occupy the outer grid positions as shown in FIG. 2. A row of five control rod assemblies 68 carrying fuel, such as uranium, is located in certain of the central grid positions adjacent to fuel elements 64. Likewise, an adjacent row of five control rod assemblies is provided and these control rod assemblies are mounted in certain of the outer grid positions adjacent some of the fuel elements 64 and between some of the reflector pieces 67. The control rod assemblies in this adjacent row each contain beryllium, and the row includes three reflector shim-rods 70 located between two regulating rods 71.

As shown in FIG. 2 there are three different types of control rod assemblies which perform both control and safety functions in the reactor core 22. First, there are the two regulating rods 71 that are driven up and down through the reactor core 22 by a hydraulic servocontrol system, and these rods move rapidly to provide fine control of the reactor power level. Second, there are the three reflector shim-rods 70 which also move up and down through the core 22, but are mechanically driven at low speeds for coarse control of reactor power. Unlike the regulator rods 71, the reflector shim-rods 70 are provided with drive-release mechanisms that will be described later in detail which allows them to drop until the beryllium is out of the core. Each drive-release mechanism operates very fast and is a safety feature in case it is necessary to scram or shutdown the reactor. Third, there are the five fuel shim-rods 68 which are driven in the same manner as the reflector shim-rods 70 and can be similarly scrammed.

Figures 3, 5, 6:
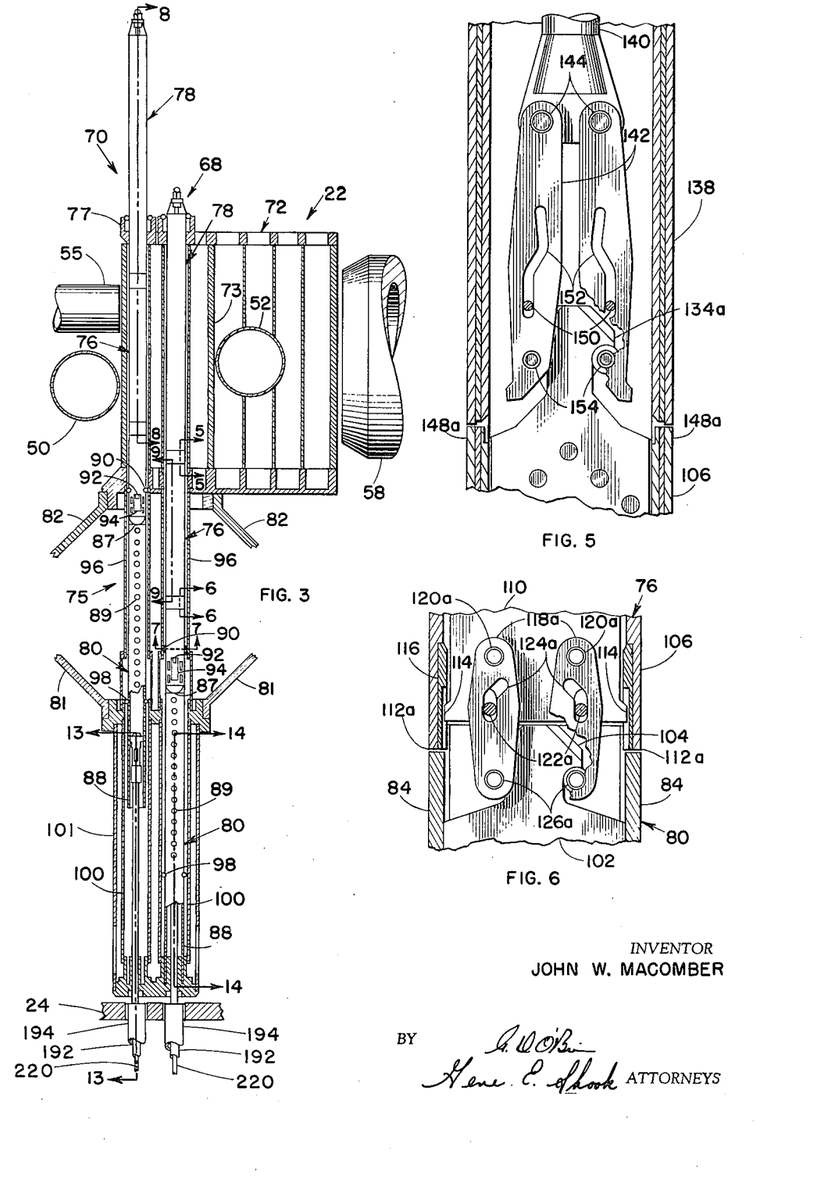
FIG. 3 is an enlarged vertical sectional view taken along the line 3—3 in FIG. 2 showing a pair of control rod assemblies constructed in accordance with the invention, one rod being shown in the fully extended position and the other rod being shown in the fully retracted position.
FIG. 5 is an enlarged sectional view taken along the line 5—5 in FIG. 3 showing a locked connection between the upper poison section and the intermediate fuel section of a fuel shim-rod.
FIG. 6 is an enlarged sectional view taken along the line 6—6 in FIG. 3 showing a locked connection between the intermediate fuel section and the lower guide section of a fuel shim-rod.

The aforementioned parts of the reactor core 22 are contained within a core box 72 that is divided into two parts by a vertical partition 73. As shown in FIGS. 2 and 3, the smaller compartment contains the uranium bearing fuel elements 64, and the control rod assemblies 68, 70, and 71 pass through this compartment. The larger compartment contains the beryllium reflector elements 66. The core box 72 provides guides for the ten control rod assemblies which extend vertically through the core 22, and the elements in the core are so arranged and geometrically spaced that water can pass up through the core reflector and down through the core elements carrying away the heat generated within them.

Referring to FIG. 3 there is shown a fuel shim-rod 68 and a reflector shim-rod 70 constructed in accordance with the invention. Both these control rod assemblies are operably connected to driving equipment 74 shown in FIGS. 1 and 4 mounted below the reactor core 22 for selectively raising the rods from a retracted position illustrated by the fuel shim-rod 68 in FIG. 3 to an extended position illustrated by the reflector shim-rod 70 to increase the power level of the reactor. By locating the driving equipment 74 below the reactor, the fuel element and reflector lattice of the core is readily accessible from the top.

The reactor power level is reduced when the driving equipment 74 retracts the control rod assemblies 68, 70 and 71 from the extended position to the retracted position. The paths of reciprocation of the control rod assemblies are determined by a vertical guide structure 75 which extends downward from the reactor core 22 to maintain the control rods in substantial juxtaposition with the fuel element 64. Bearing units 77 bolted to the top of the core box 72 accommodates misalignment and possible distortions of the upper grid relative to the guide structure 75. Each bearing unit has spring loaded rollers which engage the adjacent control rod assembly.

Each elongated control rod assembly 68, 70 and 71 comprises an intermediate section 76 interposed between an upper section 78 and a lower section 80. As shown in FIG. 3, a segment of the lower section 80 is positioned adjacent the guide structure 75 when the control rod is in either the extended position or the retracted position, and this guide structure is carried by perforated plates 81, each of which extends downward from a core pedestal 82 which forms a portion of the supporting structure 30 illustrated in FIG. 1.

Figures 4, 7:
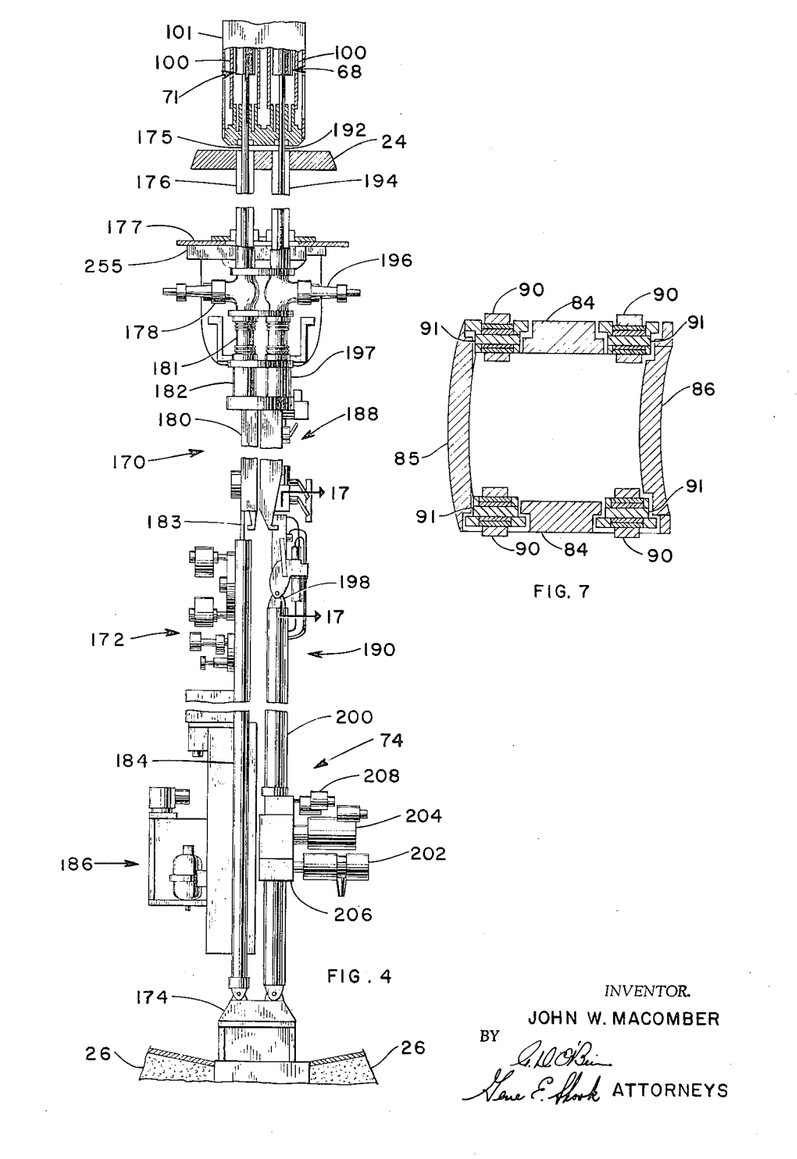
FIG. 4 is a side elevational view, with parts broken away, showing the driving mechanism for extending and retracting the shim-rods and the regulating rods constructed in accordance with the invention.
FIG. 7 is an enlarged sectional view taken along the line 7—7 in FIG. 3 showing the cross-sectional configuration of the lower guide section of a fuel shim-rod.
Figure 13:
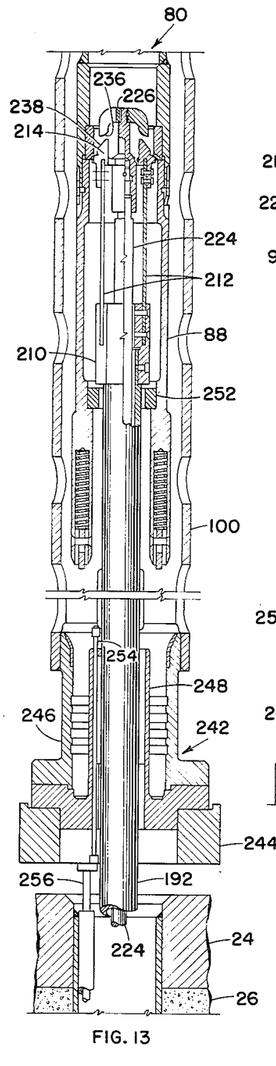
FIG. 13 is an enlarged sectional view taken along the line 13—13 in FIG. 3 showing the drive-release mechanism constructed in accordance with the present invention for operably connecting a shim-rod to its respective drive mechanism.
Figure 14:
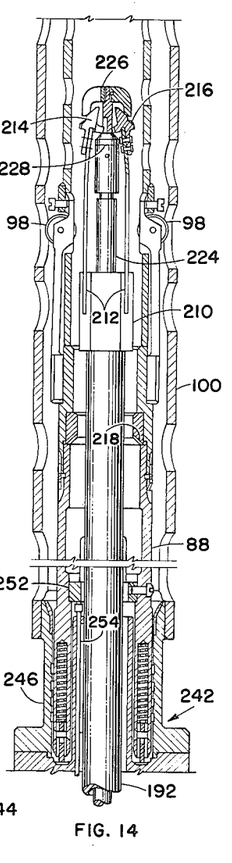
FIG. 14 is an enlarged sectional view taken along the line 14—14 in FIG. 3 showing the drive-release mechanism in a disconnecting position.

Referring to FIGS. 3, 6 and 7, the lower section 80 includes a hollow top portion comprising a water outlet segment having a generally rectangular cross section with spaced planar walls 84 connected by a slightly convex wall 85 and an oppositely disposed concave wall 86. These walls of the top portion extend through a transition segment 87 shown in FIG. 3 into a curved wall 88 of a tubular bottom portion having a circular cross section as shown in FIGS. 3, 13 and 14 which forms both a guide segment and a drive-release segment. The guide segment of the lower control rod section 80 is provided with apertures 89 in the curved wall 88 for the passage of cooling water.

A roller 90 is rotatably mounted on the lower end of each of a plurality of spring brackets 91 positioned in longitudinally extending slots in the planar sides 84 as shown in FIGS. 3 and 7, while additional rollers 92 are likewise mounted on similar brackets 94 secured to the curved walls 85 and 86. The rollers 90 and 92 are provided to reduce the possibility of rod sticking and engage the inner surface of a hollow guide tube 96 which forms the upper segment of the guide structure 75 between the plates 81 and the pedestal 82. Rollers 98 are similarly mounted on the curved wall 88 of the tubular bottom portion adjacent the apertures 89, and these rollers engage the inner surfasce of a tubular housing 100 forming the lower segment of the guide structure below the plates 81. The tubular housings 100 are contained in a protective enclosure 101 which extends downward from the plates 81 toward bottom 24 of the tank 23 and are perforated to accommodate the passage of cooling water through the apertures 89 as shown in FIGS. 13 and 14. A joining member in the form of a rigid web 102 extends between the planar walls 84 at the upper end of the hollow lower section 80 of each control rod assembly, and a double hook 104 is formed in the center of the web 102 along the upper edge thereof as seen in FIG. 6.

Figure 12:
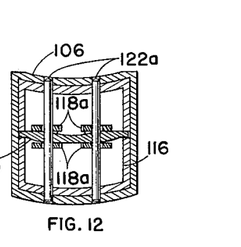
FIG. 12 is a sectional view taken along the line 12—12 in FIG. 9.

The intermediate section 76 of the fuel shim-rod 68 comprises an outer housing 106 having a cross sectional configuration shown in FIG. 12 that is similar to the hollow top portion of the lower section 80 that is illustrated in FIG. 7, and the housing 106 contains an assembly of uranium bearing curved plates 108 as seen in FIG. 2. Extending longitudinally through the center portion of the housing 106 between plates 108 is a reciprocable member in the form of an elongated bar 110 having a configuration similar to the plates 108 as best seen in FIGS. 2, 9 and 12.

Figure 9:
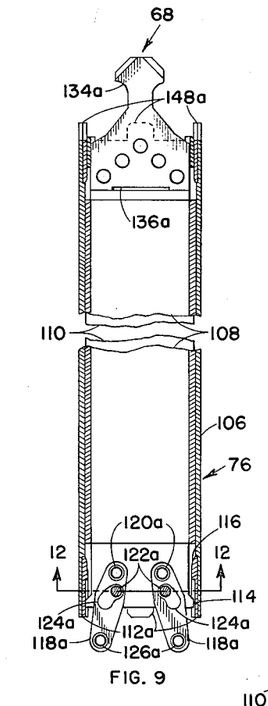
FIG. 9 is an enlarged sectional view taken along the line 9—9 in FIG. 3 showing the co-operating parts at the connections between the various sections of a fuel shim-rod in a release position.

Four downwardly protruding tabs 112a shown in FIGS. 6 and 9 extend into mating slots in the walls 84, 85 and 86 of the hollow top portion of the lower section 80 to properly align the sections 76 and 80 at assembly and to provide rigidity in the assembled control rod by preventing rotation of the intermediate section 76 relative to the lower section 80. Outwardly directed ears 114 at the lowermost end of the bar 110 slide in grooves formed in an insert 116 mounted in the lower end of the housing 106 to maintain the bar 110 in its proper spaced relationship with the fuel plates 108. Two pairs of space links 118a are mounted on pivot pins 120a in the lower end of the bar 110 as shown in FIGS. 6 and 9 while a pair of rods 122a that are rigidly mounted in both the housing 106 and the insert 116 extend through curved slots 124a in the 118a. Adequate clearance is provided in the lower end of the bar 110 to accommodate its longitudinally reciprocating movement relative to the stationary rods 122a, and as the bar 110 moves downward toward the rods 122a the curvature of each slot 124a is such that the lower ends of each pair of spaced links 118a move outward away from one another to an open position shown in FIG. 9. Conversely, upward movement of the bar 110 away from the stationary rods 122a moves the lower ends of the links 118a toward each other to a closed position shown in FIG. 6 wherein locking pins 126a engage the double hook 104 on the web 102 as shown in FIG. 6 when the sections 76 and 80 are assembled in abutting relationship.

Figure 8:
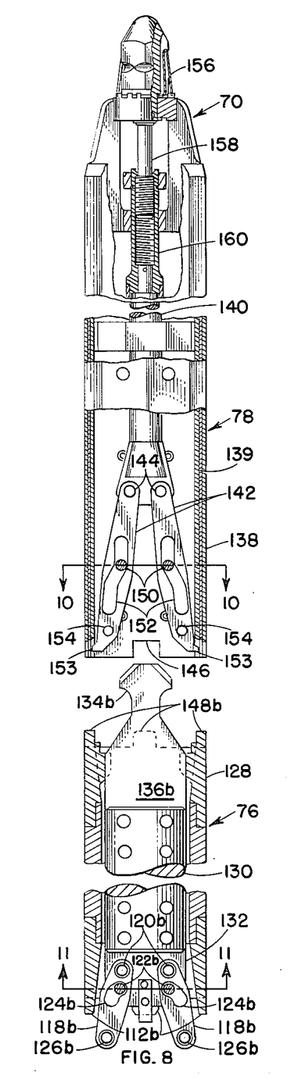
FIG. 8 is an enlarged sectional view taken along the line 8—8 in FIG. 3 showing the co-operating parts at the connections in a reflector shim-rod in a release position.
Figure 11:
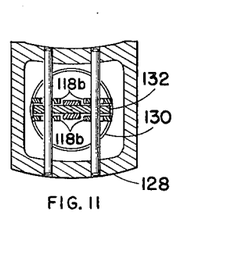
FIG. 11 is a sectional view taken along the line 11—11 in FIG. 8.

Referring now to FIGS. 2, 8 and 11, the intermediate section 76 of each reflector control rod assembly 70 comprises an outer housing 128 of beryllium having a cross sectional configuration shown in FIG. 11 that is similar to that of the hollow top portion of the lower section 80 shown in FIG. 7. A reciprocable member in the form of an elongated cylinder 130 of beryllium is slidably mounted in the housing 128. Structural rigidity is imparted to the control rod assembly when the intermediate section 76 is mated with lower guide section 80 by four downwardly extending tabs 112b shown in FIG. 8 which engage mating slots in the lower section 80. The tabs 112b are similar to the tabs 112a shown in FIGS. 6 and 9, and these tabs perform similar functions. A flat mounting rib 132 extends downward from the cylinder 130 and carries two pairs of spaced links 118b shown in FIGS. 8 and 11 on pivot pins 120b. The links 118b function in the same manner as the links 118a in that locking pins 126b in the lower ends of the links 118b move into and out of engagement with the hook 104 under the influence of the movement of slots 124b along stationary rods 122b. The construction of the intermediate section 76 in the reflector control rod assembly 70 is identical with that of the intermediate section 76 in the regulator control rod assembly 71. Also, the structure of the upper end of the intermediate section 76 for the fuel control rod assembly 68 is similar to that of the upper end of the intermediate section in the reflector control rod assembly 70 as shown in FIGS. 8 and 9 in that a double hook 134a is formed on the upper edge of a rigid web 136a that is secured to the upper end of the bar 110, and a similar hook 134b is formed on the upper end of a rigid web 136b on the top of the cylinder 130.

Figure 10:
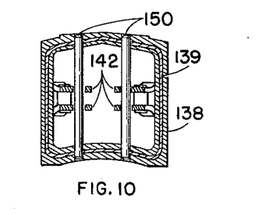
FIG. 10 is a sectional view taken along the line 10—10 in FIG. 8.

The structure of the upper section 78 of the control rod assemblies 68, 70 and 71 is shown in FIG. 8. This section comprises a generally rectangular hollow housing 138 with a cross sectional configuration shown in FIG. 10 that is similar to that of the intermediate sections 76 shown in FIGS. 11 and 12. A layer of cadmium 139 is carried by the housing 138 to poison the reactor core 22 by absorbing neutrons. Extending longitudinally through the housing 138 along its centerline is an elongated draw bar 140 having two pairs of spaced links 142 pivotally mounted on its lower end by pivot pins 144. Four recesses 146 are formed in the lowermost edge of the housing 138 to receive either upwardly directed mating tabs 148a on the housing 106 shown in FIG. 9 or similar tabs 148b on the housing 128 shown in FIG. 8. The operation of the links 142 is similar to that of the links 118a and 118b in that downward movement of the draw bar 140 toward transversely extending stationary pins 150 carried by the housing 138 causes the lower ends of the links 142 to spread apart under the influence of the curved slots 152 as best seen in FIG. 8. Outwardly extending ears 153 on the ends of the links 142 engage the top edge of the adjacent intermediate section 76 as the draw bar 140 continues to move downward to positively separate the upper section 78 therefrom. Upward movement of the draw bar 140 moves the lower ends of the links 142 toward one another as shown in FIG. 5 to move locking pins 154 into engagement with the hook 134a as shown in FIG. 5 or the hook 134b shown in FIG. 8.

Reciprocating movement of the draw bar 140 is obtained by rotating a cap 156 on the outer end of the upper section 78. As shown in FIG. 8, a threaded rod 158 extends downward from the cap 156 into a hollow member 160 having mating threads. The uppermost portion of the draw bar 140 is connected to the hollow member 160 so that rotation of the cap 156 moves both the member 160 and the draw bar 140 longitudinally along the housing 138.

When it becomes necessary or desirable to remove the upper or poison section 78 of any of the control rod assemblies 68, 70 or 71 the cap 156 is rotated as previously described to move the draw bar 140 and links 142 downward toward the intermediate section 76. Engagement of the stationary pins 150 with the curved slots 152 causes the locking pins 154 to disengage the hook 134a or 134b. The upper section 78 is then gripped by any suitable tool and disassembled from the remainder of the control rod assembly without removing either the intermediate section 76 or the lower guide section 80 from the reactor.

A replacement upper section 78 is positioned over the portion of the control rod assembly remaining in the reactor, and the links 142 are properly aligned with the hook 134a or 134b by the tabs 148a or 148b on the intermediate section 76. The cap 156 is then rotated in the opposite direction to move the draw bar 140 and links 142 away from the intermediate section 76. This moves the locking pins 154 into engagement with the hook 134a or 134b as previously described.

The intermediate section 76 is replaced by first removing the upper section 78 in the previously described manner. The bar 110 in the fuel shim-rod 68 or the beryllium cylinder 130 in either the reflector shim-rod 70 or the regulating rod 71 is then moved toward the lower section 80 to swing the locking pins 126a or 126b out of engagement with the hook 104 by the angular movement of the links 118a or 118b. This movement of the reciprocal member 110 or 130 is accomplished by gripping the hook 134a or 134b by any suitable tool which forms no part of the present invention. Upon disengagement of the locking pins 126a or 126b from the hook 104 the intermediate section 76 is gripped and withdrawn from the reactor core 22 without removing the lower guide section 80.

A replacement intermediate section 76 is positioned over the lower guide section 80 and aligned therewith by the tabs 112a or 112b. The reciprocable member 110 or 130 may be drawn upward by pulling on the hook 134a or 134b which moves the locking pins 126a or 126b into engagement with the hook 104. The newly assembled intermediate section 76 is now ready to receive its upper section 78 which is assembled thereto in the manner previously described. An alternate mode of assembly comprises positioning the upper section 78 in contact with the intermediate section 76 before the reciprocable members 110 or 130 are drawn upward and utilizing the rotation of the cap 156 to move both the draw bar 140 and the reciprocable members.

As stated above, the two regulating rods 71 provide continuous fine control of the reactor power level and are coupled to an automatic servocontrol system. The eight shim-rods 68 and 70 provide the coarse adjustment of reactivity and nuclear safety control. Normally only one regulating rod 71 will be in the servocontrol at a time while the other regulating rod 71 is withdrawn and locked out of the core 22. This other regulating rod 71 serves as a stand-by to be manually interchanged with the operating regulating rod 71 and placed in operation at the discretion of the reactor operator. Automatic regulation or servocontrol of the reactor is provided through the use of a log $N$ servoamplifier, motor-driven set point, set point power limiter and regulating rods 71.

Referring to FIG. 4, there is shown a fully retracted regulating rod 71 connected to a regulating rod drive assembly 170 which, in turn, is operably connected to a regulating rod actuator assembly 172 that is pivotally mounted on a pedestal 174 located beneath the floor grating of the sub-pile room 46. The middle portion of the regulating rod drive assembly 170 includes a bar 175 which passes through a tube liner 176 in a hole in the concrete 26 that extends downward from the bottom 24 of the tank 23 through the ceiling 177 of the sub-pile room 46. The upper portion of the drive assembly 170 includes means for operably connecting the bar 175 to the lower section 80 of the regulating rod 71.

The bar 175 passes through a gate valve 178 mounted on the bottom of the liner 176 into a housing 180 that encloses the lower portion of the assembly 170. Mounted on the bottom of the valve 178 is a bellows expansion joint 181 which compensates for any misalignment of the liner 176. A seal assembly 182 is mounted between the expansion joint 181 and the housing 180 to minimize water leakage around the bar 175. A bar 183 which forms the upper portion of the regulating rod actuator assembly 172 is connected to the bar 175 in the housing 180. The bar 183 is mounted for reciprocation in a housing 184 having various components 186 of the servocontrol system mounted thereon, and rapid movement of the bar 183 along its longitudinal axis is provided by the servocontrol system to insure fine control of the reactor power level. A regulating rod 71 is automatically controlled when it is placed "on-servo" so that any difference occurring between the aforementioned motor-driven set point which defines the desired power level and the log $N$ servoamplifier which defines the actual power develops an error voltage. The polarity of this voltage depends upon whether the actual power leads or lags the desired power, and the magnitude of the error signal is a function of the amount of lead or lag. The error voltage is amplified by the regulating rod servoamplifier and the resulting signal is applied to a regulator rod actuator servovalve. The motion of the regulating rod 71 continues until the desired power level is equal to the actual power level.

The regulating rod drive assembly 170 and actuator assembly 172 form a portion of the driving equipment 74, the remainder of which comprises a shim-rod drive assembly 188 and a shim-rod actuator assembly 190. The middle portion of the shim-rod drive assembly 188 includes a hollow drive-rod 192 which passes through a hole in the concrete 26 having a liner 194 therein that extends downward from the bottom 24 of the tank 23 to the sub-pile room 46. The drive-rod 192 extends through a gate valve 196 that is bolted to a flange at the bottom of the liner 194 adjacent the valve 178. These valves are opened during normal operation and are closed when the drive assemblies 170 and 188 are removed into the subpile room 46 for repair to prevent leakage of water from the tank 23. A seal assembly 197 is mounted on the valve 196 adjacent the seal 182. The drive-release mechanisms shown in FIGS. 13–15 for operably connecting the drive-rod 192 to the lower section 80 of the shim-rods 68 and 70 are located at the upper ends of the driving assemblies 188 while scram-latch mechanisms shown in FIGS. 16 and 17 for operating these drive-release mechanisms are positioned at the lower ends below the seal assemblies 197.

Figure 17:
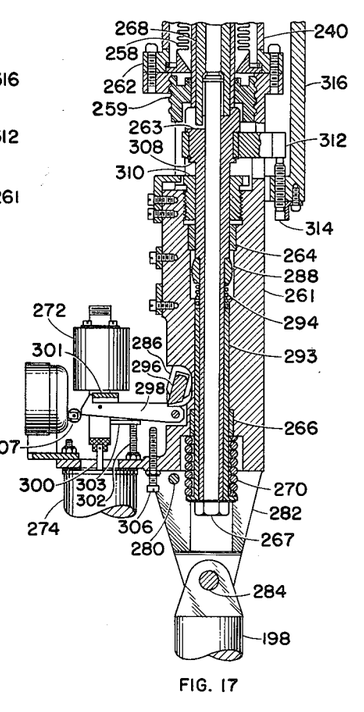
FIG. 17 is an enlarged sectional view taken along the line 17—17 in FIG. 4 showing a portion of the scram-latch mechanism in a locked operating position.
Figure 18:
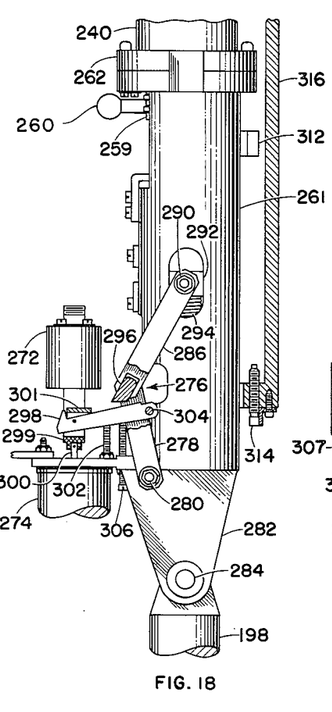
FIG. 18 is a view similar to FIG. 17 but showing the portion of the scram-latch mechanism in an unlatched position.

The shim-rod actuator assembly 190 comprises a bar 198 that is pivotally connected to the lower portion of the shim-rod drive assembly 188 adjacent the scram-latch mechanism as shown in FIGS. 17 and 18. The actuator assembly 190 further includes an elongated housing 200 which mounts the bar 198 for reciprocable movement along its longitudinal axis. The bottom of the housing 200 is pivotally supported by a trunnion on the pedestal 174, and this housing mounts the various means for reciprocating the bar 198 including a servomotor 202 and a fast reverse motor 204. The servomotor 202 is operably connected to the bar 198 through self-locking worm gears in a gear box 206, and this motor is capable of slowly extending or retracting the shim-rods 68 and 70 in a speed range of about 0–3 inch per minute. Continuous and jog manual switches (not shown) are provided for rough and fine shim-rod position adjustment respectively. The fast reversing motor 204 is likewise connected to the bar 198 through a separate set of self-locking worm gears in the gear box 206, and this motor is utilized to retract the shim-rods from their extended positions in the reactor core 22 at a high speed of nine inches per minute. A common differential epicyclic gear train engages both sets of worm gears, and the output drives the bar 198 through a lead screw in the housing 200. The locked worm gears prevent the motors 202 and 204 from driving each other, and suitable interlocks are incorporated in the control circuitry so that only one motor can drive a shim-rod at any given time.

A position indicator 208 monitors the location of each shim-rod 68 and 70 at all times. For the sake of simplicity, FIG. 1 shows only one shim-rod actuator assembly connected to its driving assembly. However, it will be appreciated that each shim-rod drive assembly 188 has an actuator assembly 190 connected thereto. Likewise, each of the two regulator rods 71 is connected to a drive assembly 170 and actuator assembly 172.

Figure 15:
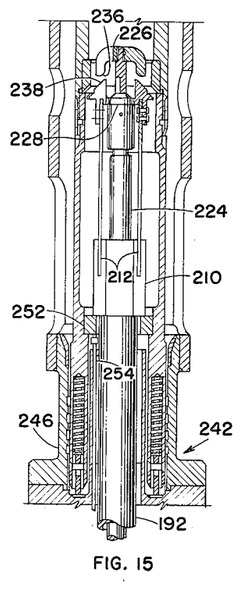
FIG. 15 is an enlarged sectional view showing the drive-release mechanism in a connecting position prior to raising the shim-rod to an extended position.

Referring to FIGS. 13–15, there is shown the drive-release mechanism that is constructed in accordance with the invention for operably connecting the shim-rod drive assembly 188 to the shim-rods 68 and 70. Each of these connecting means is housed in the drive-release segment of a lower section 80 and includes a tubular cap 210 that is rigidly secured to the top of the drive-rod 192. A plurality of relatively stiff springs 212 protrude upwardly from the cap 210, and each spring 212 has a release button 214 mounted thereon. Each button 214 has an inclined surface 216 for engaging a mating inclined shoulder 218 in the lower section 80 of each shim-rod assembly. For improved wearing qualities these mating surfaces are formed on hardened inserts 220 and 222, respectively, as shown in FIG. 16.

A release-rod 224 that is slidably mounted in the drive-rod 192 protrudes upward through the tubular cap 210. A plunger 226 which is mounted on the upper end of the release-rod 224 has an outwardly directed peripheral surface 228 for engaging an inwardly directed surface 230 on each button 214 to maintain the springs 212 and buttons 214 in a first position as shown in FIGS. 13 and 15. Here again, these mating surfaces 228 and 230 are formed on hardened inserts 232 and 234, respectively. The upper end of the plunger 226 has a plurality of inclined surfaces 236 which are inwardly directed for engaging outwardly directed inclined surfaces 238 on each button 214 to move these buttons to a second position shown in FIG. 14 wherein the shim-rod 68 or 70 is disconnected from the drive assembly 188.

Figure 16:
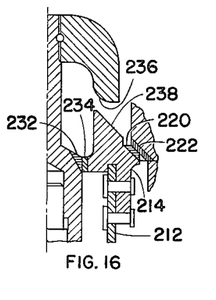
FIG. 16 is an enlarged sectional view of a portion of the drive-release mechanism in the connecting position wherein the shim-rod is operably connected to the drive mechanism.

During normal operation of the reactor, the various elements of each connecting mechanism are positioned as shown in FIGS. 13 and 16 with each surface 228 on the plunger 226 engaging the mating surface 230 on each of the buttons 214 to maintain the inclined surfaces 216 in contact with the engaged shoulder 218 in shim-rods 68 and 70. Bearing pressure at this shoulder is produced by the weight of the shim-rods and the water pressure, and none of this pressure is transmitted to either the plunger 226 or the release rod 224. Upward movement of the drive-rod 192 under the influence of the shim-rod actuator assembly 190 carries the shim-rod 68 or 70 upward. This moves the uranium fuel in the intermediate section 76 of the fuel control rod 68 or the beryllium reflector in the reflector control rod assembly 70 towards the center of the reactor core 22 to increase the power level of the reactor. This motion is initiated by the servomotor 202 as previously described. Downward movement of the drive-rod 192 under the influence of either the servomotor 202 or the fast reverse motor 204 produces downward movement of the adjacent shim-rod assembly 68 or 70 because of the downward force exerted thereon by gravity and hydraulic pressure in a chamber 240 immediately above the latch mechanisms shown in FIGS. 17 and 18. This hydraulic pressure may be quite sizable, on the order of 100 p.s.i., and is produced by the passage of water in the space between the release-rod 224 and the inner surface of the drive-rod 192.

A small downward travel on the order of ¼ inch of the release-rod 224 relative to the drive-rod 192 disengages the plunger surface 228 from the mating surfaces 230 thereby enabling the buttons 214 to move inwardly from a first position shown in FIG. 13. As the inclined surfaces 216 move out of contact with the shoulder 218, the released shim-rod 68 or 70 is free to drop under the combined forces of gravity and water pressure.

The falling shim-rods are stopped by shock absorbers in the form of dashpots 242 shown in FIGS. 13–15 mounted on a plate 244 that is carried by the enclosure 101 as illustrated in FIGS. 3 and 4. Each dashpot 242 is formed by the annular space between two concentric cylinders 246 and 248 that are preferably tapered, and the bottom end of the aligned lower section 80 fits into this annular space. Because the dashpots 242 are located within the reactor tank 23, they are filled with water which acts as a damping fluid to absorb the energy of the dropping shim-rod. This energy is further absorbed by spring loaded inserts 250 in the bottom section 80.

Additional travel on the order of 3/16 inch of the release-rod 224 relative to the drive-rod 192 produces a positive gripping of the buttons 214 in a second position shown in FIG. 14 as the plunger surfaces 236 engage the button surfaces 238. This action insures positive disengagement of the drive-rod 192 from the lower section 80 and eliminates any possible interference between the buttons 214 and the shoulder 218 during removal of an entire shim-rod assembly from the reactor core 22.

In the event a shim-rod binds and will not move downward as the drive-rod 192 is lowered, the lower edge of the cap 210 engages the upper surface of a ring 252 that is secured within the lower section 80, as shown in FIG. 15. Both the cap 210 and the ring 252 have spline-like slots to permit removal of a shim-rod by simply rotating the drive-rod 192 until the slots in the cap 210 are moved out of alignment with the slots in the ring 252. When a shim-rod is fully retracted with the bottom of the lower section 80 in the dashpot 242 as shown in FIGS. 14 and 15, the lower surface of the ring 252 engages a rod 254 that activates a scram-indicating switch 255 through another rod 256.

Referring to FIGS. 17 and 18, there is shown the scram-latch mechanism for initiating the motion of the release-rod 224 relative to the drive-rod 192. This mechanism is located in the sub-pile room 46 for convenience of installation, inspection, maintenance and adjustment. The chamber 240 is rigidly mounted on the drive-rod 192 in any convenient manner. For example, the top of the chamber 240 may be in the form of a collar that seats with the tapered lower end of the drive-rod 192.

A bellows seal 258 within the chamber 240 connects the drive-rod 192 with the release-rod 224. Pressurized water in the chamber 240 acts on the bellows seal 258 to force the release-rod 224 downward relative to the drive-rod 192. In case of leakage around the bellows seal 258, the connection is manually sealed by tightening a nut 259 having a handle 260 therein.

A drive-rod extension in the form of a housing 261 is bolted to a flange 262 at the bottom of the chamber 240 while a release-rod extension 263 slides in a pair of guide bearings 264 and 266 mounted within the housing 261, as shown in FIG. 17. An elongated bolt 267 secures the release-rod extension 263 to a coupler 268 that is mounted on the bottom of the release-rod 224. The coupler 268 engages a sleeve 269 having its top sealed to the bellows 258 and its bottom passing through the nut 259. A spring 270 exerts an additional force in the release-rod by engaging both the head of the bolt 267 as well as the bearing 266. A scram-latch magnet 272 and solenoid actuator 274 are likewise carried by the housing 261.

The scram-latch mechanism utilizes a break-leg device 276 shown in FIGS. 17 and 18 which include a lower leg 278 having a bottom pivot 280 mounted between a pair of spaced tips 282 extending downward from the housing 261. The ends of the tips 282 form a bifurcation that is pivotally connected to the top of the bar 198 about a pin 284. The break-leg device 276 further includes an upper leg 286 having its top end operatively connected to a collar 288 by a trunnion 290 that extends through a slot 292 in the housing 261. The position of the top end of the upper leg 286 relative to the release-rod extension 263 is fixed except for some play which is allowed between the collar 288 and a sleeve 293. This play is restrained by a spring 294 having one end which engages the collar 288 and the opposite end which engages the sleeve 293.

A latch bar 296 is provided at the common pivot junction of the lower leg 278 and the upper leg 286, and the lower end of this bar engages a trigger arm 298. FIG. 17 shows the latch bar 296 as being held by the trigger arm 298 so that the break-leg device 276 restrains the release-rod 224 relative to the drive-rod 192 in the position shown in FIG. 3. FIG. 18 shows the break-leg device 276 in the unlatched position which enables the release-rod 224 to move to the position shown in FIG. 14. The total downward force tending to unlatch the break-leg device 276 is resisted by friction forces caused by the side pressure on the release-rod plunger 226 in the position shown in FIG. 13 and by the counter-balancing force on the break-leg junction exerted by the magnet 272 and solenoid 274 through the trigger arm 298 and latch bar 296.

Referring to FIGS. 17 and 18 a generally U-shaped bracket 299 is carried by a vertical plunger 300 that reciprocates in the solenoid 274. The magnet 274 is mounted on the spaced legs of the bracket 299 while the trigger arm 298 extends between these legs to position an armature piece 301 beneath the magnet. A pair of vertical guides 302 extend through projections 303 on the bracket 299 to prevent the magnet 272 from rotating as it is moved up and down by the reciprocation of the plunger 300.

A pivot pin 304 extending through the opposite end of the trigger arm 298 mounts the trigger arm on the housing 261, and downward pivotal movement is limited by an adjustable stop 306. Because the armature piece 301 is mounted on the trigger arm 298, the upward movement of this arm is limited by the magnet 272.

When the release-rod 224 and the drive rod 192 are as shown in FIG. 15, the de-energized magnet 272 is lowered into contact with the armature piece 301 by de-energizing the solenoid 274, and energization of the magnet maintains this contact. The solenoid 274 is then energized and the magnet 272, armature 301 and trigger arm 298 are all raised to the latched position shown in FIG. 17 wherein the outer end of the trigger arm actuates a switch 307 which signals that the drive-rod 192 can now be driven upward with the break-leg 276 preventing a scram.

The trigger arm 298 is released to initiate a scram by de-energizing either the magnet 272 or the solenoid 274. By merely de-energizing the magnet 272, the armature piece 301 and the trigger arm 298 will fall away from the magnet under the influence of the forces on the trigger arm 298 to the position shown in FIG. 18. When the solenoid 274 is de-energized the entire magnet assembly including the magnet 272 and bracket 299 together with the armature 301 and the trigger arm 298 will fall to the scram position. When the magnet 272 is de-energized and the armature piece 301 together with the trigger arm 298 are released, a re-energization of the magnet will not pick up the armature because of the large air gap shown in FIG. 18. In this case the solenoid must be first de-energized to drop the magnet 272, as previously described. The magnet 272 is then energized to pick up the armature piece 301 at the outermost end of the trigger arm 298, and the solenoid 274 is energized to move the entire assembly upward into the position shown in FIG. 17. The utilization of both the magnet 272 and solenoid 274 to control the latching and unlatching of the break-leg 276 is required to insure the start of a shim-rod drop within the forty milliseconds time limit. By way of example, a magnet 272 which exerted a force of nine pounds on the armature piece 301 at a current of forty milliamperes released the trigger arm 298 in four milliseconds when the current was interrupted, and the break-leg 276 then unlatched the release-rod 224 in an additional fifteen milliseconds. This time would be much longer if only a solenoid were used because of the time required for the decay of its magnetic field.

As previously described, a small downward movement of the release-rod 224 relative to the drive-rod 192 releases the shim-rod 68 or 70 and produces a scram action. When unlatched, the movement of the release-rod 224 downward is stopped by the impact of a shoulder 308 on the release-rod extension 263 against the upper face of a steel nut 310 that is screwed into the housing 261.

To relatch after a scram, the drive-rod 192 is driven down to a position where a relatching arm 312 on the release-rod extension 263 contacts an adjustable relatch stop 314 on a fixed frame 316 that extends downward from the seal assembly 182. Further downward motion of the drive-rod 192 pulls the release-rod 224 relative to the drive-rod against the action of the downward forces and moves the nut 310 out of engagement with the shoulder 308. The release-rod 224 is then in proper position shown in FIG. 15 for relatching by solenoid and magnet action as previously described. The relatching arm 312 runs in a slot in the housing 261 so that the release-rod 224 cannot rotate relative to the drive-rod 192.

In a typical reactor installation, it was found that the total force downward on the latch was about 460 pounds with the weight of the release-rod 224 contributing ten pounds, the force in bellows seal 258 producing 330 pounds, and the spring 270 adding another 120 pounds. This 460 pound force produced a force of only about ten pounds on the solenoid plunger 300 because of mechanical multiplication to be overcome by the solenoid magnet. The spring 270 alone or the bellows seal 258 alone exert enough force to trip the break-leg 276 so that if either the spring or the bellows broke, the unlatching action would still occur although the dead time in the unlatching process would be increased.

Figure 19:
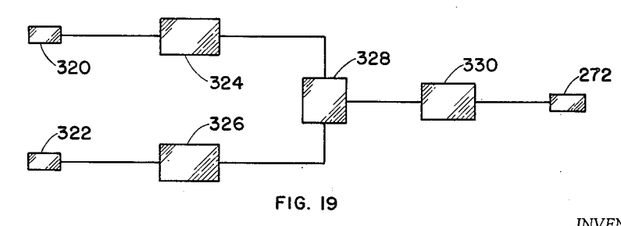
FIG. 19 is a diagrammatic view showing a typical control means for initiating a scram.

Referring to FIG. 19, there is shown a typical control means for initiating a scram which includes neutron detectors 320 and 322 positioned within the reactor core 22. Each detector 320 is connected to an amplifier 324 located in the reactor control room, and an electric signal from the detector produces a reading that indicates the power level of the reactor. The detector 322 is likewise electrically connected to another amplifier 326 which indicates the rate of change of the neutrons in the core 22. Both the amplifiers 324 and 326 are electrically connected to an "OR" gate 328 that operates magnet drivers 330 which supply power to the latch magnets 272. The "OR" gate enables a trip signal from either amplifier 324 or 326 to supply a signal to the magnet drivers 330 which shuts off the power to the latch magnets 272.

In operation, an increase in the neutrons above a fixed level or an abnormal rise in neutrons rate of change will be detected by the amplifiers 324 and 326. The resulting trip signal to the "OR" gate 328 cuts off the magnet signal to the magnet drivers 330 which, in turn, de-energizes the latch magnets 272. The break-leg 276 then moves to the position shown in FIG. 18 in the previously described manner. This initiates a scram action of the release-rod 224 which was also previously described thereby enabling the shim-rods to move from the position shown in FIG. 13 to that shown in FIG. 14.

When it is desired to relatch, the drive-rod is pulled downward to the position shown in FIG. 17 thereby positioning the connection means as shown in FIG. 15. Upward movement of the drive-rod 192 will move the shim-rod back to the position shown in FIG. 13.

Although only the preferred embodiment of the improved nuclear reactor control rod assembly and driving mechanism has been shown and described, various structural modifications may be made to this rod and mechanism without departing from the spirit of the invention or the scope of the sub-joined claims.

What is claimed is:

1. A control rod for a nuclear reactor comprising,
   a plurality of sections, containing mating members and movable locking members, and
   assembly means for selectively securing said sections together, said assembly means including reciprocable members in certain of said sections operably connected to said locking members for moving the same into and out of engagement with said mating members when said control rod is in said nuclear reactor.

2. In a reactor control rod having a plurality of elongated sections positioned in abutting relationship, the improvement comprising
   rigid hooks and locking pins on said sections for engaging each other to form a rigid structure, pivotally mounted links for supporting said locking pins, and
   means for selectively swinging said links to move said locking pins out of engagement with said rigid hooks whereby said rigid structure may be disassembled.

3. A control rod for a nuclear reactor comprising,
   an intermediate section interposed between opposed end sections,
   first mating members in the control rod for engaging each other thereby rigidly securing a first end section to said intermediate section in abutting relationship, means in the control rod for moving said first mating members out of engagement thereby releasing said first end section from said intermediate section while a second end section remains secured to said intermediate section, and
   second mating members in the control rod for engaging each other thereby rigidly securing said second end section to said intermediate section in abutting relationship, means in the control rod for moving said second mating members out of engagement thereby releasing said intermediate section from said second end section after said release of said first end section while said second end section is in said nuclear reactor.

4. Apparatus for regulating the power level of a nuclear reactor having a core containing a plurality of fuel elements, said apparatus comprising
   a plurality of control rods mounted vertically in said core, each of said control rods comprising
   a first section,
   at least one other section adjacent said first section, and
   a plurality of mating members for selectively securing said first section to said other section,
   driving means for selectively raising said first section into said core to increase said power level and controlling the lowering of said first section out of said core to decrease said power level,
   first means for selectively connecting said driving means to said other section during said raising, and
   second means for connecting said driving means to said control rod when said first means is disconnected from said other section to positively lower said control rod.

5. In apparatus for regulating the power level of a nuclear reactor having a core containing a plurality of fuel elements,
   a plurality of sectionalized control rods extending into said core,
   a plurality of guides extending outward from said core for arranging said control rods in substantial juxtaposition with said fuel elements, each of said control rods having one section adjacent one of said guides, said one section including
   a first portion having spaced planar sides,
   a second portion having generally curved sides, and
   a member extending between said planar sides adjacent an end of said one section for engaging a mating member on an adjacent control rod section,
   drive means for moving said control rods along said guides, and
   means located within said second portion for operably connecting said drive means to said control rod.

6. In apparatus for regulating the power level of a nuclear reactor having a core containing a plurality of fuel elements,
   a plurality of control rods extending into said core,
   guide means for positioning said control rods in substantial juxtaposition with said fuel elements,
   drive means for moving said control rods along said guide means,
   each of said control rods comprising
      an intermediate section positioned between spaced end sections, one of said end sectiosn being connected to said drive means and positioned adjacent to said guide means,
      a joining member rigidly mounted in an end of said one end section adjacent said intermediate section, and
      means carried by said intermediate section for selectively engaging said joining member while said one end section is connected to said drive means whereby said intermediate section may be disassembled from said one end section while said one end section is adjacent said guide means.

7. In apparatus for regulating the power level of a nuclear reactor having a core containing a plurality of fuel elements,
   a plurality of control rods extending into said core,
   guide means for positioning said control rods in substantial juxtaposition with said fuel elements,
   drive means for moving said control rods along said guide means,
   each of said control rods comprising
      an intermediate section positioned between spaced end sections, one of said end sections being connected to said drive means and positioned adjacent said guide means,
      a joining member rigidly mounted in an end of said one end section adjacent said intermediate section, a reciprocable member extending longitudinally along said intermediate section between said end sections, means mounted on said reciprocable member for engaging said joining member as said reciprocable member is moved away from said one end section, and means mounted on the other end section for moving said reciprocable member away from said connecting member.

8. In apparatus for regulating the power level of a nuclear reactor having a core containing a plurality of fuel elements, a plurality of control rods extending into said core, guide means for positioning said control rods in substantial juxtaposition with said fuel elements, each of said control rods comprising an intermediate section positioned between spaced end sections, one of said end sections being connected to said drive means and positioned adjacent to said guide means, a joining member rigidly mounted in an end of said on end section adjacent to said intermediate section, a reciprocable member extending longitudinally along said intermediate section between said end sections, at least one slotted link pivotally mounted on said reciprocable member for moving a locking member relative to said joining member, a rod having a central portion for engaging the slotted portion of said link and having opposed ends secured to said intermediate section, and means mounted on the other end section for moving said elongated member away from said connecting member, said slotted portion having a curved configuration to move said locking member into engagement with said joining member thereby selectively securing said intermediate section to said one end section as said reciprocable member moves away from said joining member, said reciprocable member being mounted for movement toward said joining member whereby said slotted portion moves said locking member out of engagement with said joining member thereby enabling said intermediate section to be disassembled from said one end section while said one end section is adjacent said guide means.

9. Apparatus for regulating the power level of a nuclear reactor having a core containing a plurality of fuel elements and for maintaining said power level below a predetermined maximum value, said apparatus comprising a plurality of elongated control rods extending vertically through said core and arranged in substantial juxtaposition with said fuel elements, each of said control rods comprising a first section and at least one other section adjacent said first section, and assembly means for selectively securing said first section to said other section, driving means mounted below said reactor for selectively raising said first section into said core to increase said power level and lowering said first section out of said core to decrease said power level, connecting means for operably connecting said driving means to said control rod, said connecting means including at least one member movable from a first position for engaging said control rod to a second position for disengaging said control rod, disassembly means for releasing said first section from said other section independently of the operation of said connecting means, and disengaging means responsive to an increase in said power level above said predetermined maximum value for moving said member from said first position to said second position thereby enabling said first section to fall away from said core.

10. Apparatus for regulating the power level of a nuclear reactor having a core containing a plurality of fuel elements and for maintaining said power level below a predetermined maximum value, said apparatus comprising a plurality of vertical control rods arranged in substantial juxtaposition with said fuel elements, each of said control rods comprising an intermediate section interposed between an upper section and a lower section, driving means mounted below said reactor for selectively extending said control rods from a retracted position to increase said power level and retracting said control rods from an extended position to decrease said power level, connecting means for operably connecting said driving means to each of said control rods, said connecting means including members movable from a first position for engaging said lower sections to a second position for disengaging said lower sections, first assembly means for selectively securing said upper sections to said intermediate sections and releasing said upper sections from said intermediate sections when said members are in said first position, second assembly means for selectively securing said intermediate sections to said lower sections and releasing said intermediate sections from said lower sections when said members are in said first poition, and disengaging means responsive to an increase in said power level above said predetermined maximum value when said control rods are in said extended position for moving said members from said first position to said second position thereby enabling said control rods to fall to said retracted position.

11. Apparatus for regulating the power level of a nuclear reactor having a core containing a plurality of fuel elements and for maintaining said power level below a predetermined maximum value, said apparatus comprising vertical control rods in said core, said control rods being mounted for movement along their longitudinal axes from a retracted position for minimum power to an extended position for maximum power, a vertically extending tubular driving member mounted below each of said control rods, connecting members mounted on each of said tubular driving members for engaging an adjacent control rod to operably connect the same, said connecting member being mounted for movement from a first position in engagement with said control rod to a second position removed from said control rod.

locking means for selectively maintaining said connecting members in engagement with said control rods and for moving said connecting members out of engagement with said control rods thereby enabling the same to drop to said retracted position, a release rod reciprocably mounted in each of said tubular driving members and having an upper end portion adjacent said connecting member, a plunger member mounted on said upper end portion of said release rod for contacting said connecting member, actuator means secured to each of said tubular driving members remote from said connecting member to move said tubular driving member in an upward direction whereby said control rod is extended from said retracted position and in a downward direction whereby said control rod is retracted from said extended position, and means for moving said release rod relative to said tubular driving members independently of the operation of said actuator means from one position wherein said plunger member maintains said connecting members in said first position to another position wherein said plunger member maintains said connecting members in said second position.

References Cited by the Examiner

UNITED STATES PATENTS

| | | | |
|---|---|---|---|
| 2,857,324 | 10/58 | De Boisblanc et al. | 176—86 |
| 2,952,600 | 9/60 | Newson | 176—86 |
| 3,020,887 | 2/62 | Hobson et al. | 176—36 |
| 3,121,045 | 2/64 | Harris et al. | 176—36 |

CARL D. QUARFORTH, *Primary Examiner.*